United States Patent [19]

Ikeya et al.

[11] Patent Number: 4,717,122

[45] Date of Patent: Jan. 5, 1988

[54] METHOD OF LAYING OPTICAL CABLE IN AERIAL LINE

[75] Inventors: Takao Ikeya; Norio Katsuoka, both of Tokyo, Japan

[73] Assignee: The Furukawa Electric Co., Ltd., Tokyo, Japan

[21] Appl. No.: 908,012

[22] Filed: Sep. 16, 1986

[30] Foreign Application Priority Data

Sep. 20, 1985 [JP] Japan .................. 60-206689

[51] Int. Cl.$^4$ ........................... B65H 59/00
[52] U.S. Cl. ............................. 254/134.3 R
[58] Field of Search ............ 174/43, 44, 45, 73 R, 174/88 R; 254/134.5 R, 134.5 PA, 134.3 FT, 134.3 SC

[56] References Cited

U.S. PATENT DOCUMENTS 4,408,091 10/1983 Laar ........................ 254/134.3 R
4,409,428 10/1983 Dey et al. ..................... 174/43

Primary Examiner—Robert C. Watson
Attorney, Agent, or Firm—Schwartz, Jeffery, Schwaab, Mack, Blumenthal & Evans

[57] ABSTRACT

A method of laying an optical cable in an aerial line which comprises the steps of winding the optical cable measured in a necessary length between laying zones on a reel, mounting optical connectors at both ends of the reel, laying the optical cable by winding at the aerial line by mounting the reel on a winding machine moving on the aerial aline already installed, disposing the optical connectors on the supports at both ends of the laying zone, similarly laying at the adjacent zones of the laying zones, and connecting the optical cables of the adjacent zones on the support. Thus, since the optical cables of the adjacent zones can be connected on the support, the connecting work at the laying site can be extremely simplified. Thus, this method can very simply connect at the laying site by connecting the optical cable of the adjacent zone on the support.

3 Claims, 3 Drawing Figures

METHOD OF LAYING OPTICAL CABLE IN AERIAL LINE

BACKGROUND OF THE INVENTION

This invention relates to a method of laying an optical cable by winding in an aerial line which has already been installed and, more particularly, to a method of simply connecting the optical cables of adjacent zone on a support.

Heretofore, when optical cables were laid along an aerial line such as an aerial ground line, a reel which winds the optical cable of a predetermined length was mounted in a mounting machine, and the optical cable was laid by winding by moving the machine along the aerial line already installed. In this case, since the length of the optical cable was limited, the installation of the optical cable was executed at every predetermined installing zone and the optical cables of adjacent zones were connected to construct long-distance optical cable lines.

The connection of the optical cables of this case was carried out at the position of a support such as a pylon or steel tower. However, it is very difficult to connect the fine optical cables by treating the ends of the optical cables while braving the wind at a high place for a long period of time.

SUMMARY OF THE INVENTION

Accordingly, it is an object of this invention to provide a method of laying an optical cable along an aerial line which can eliminate the above mentioned drawbacks by allowing simple connections at the laying site by connecting the optical cables of the adjacent zones on a support.

In order to achieve the above and other objects, there is provided according to the present invention a method of laying an optical cable along an aerial line which comprises the steps of winding the optical cable measured in a necessary length between laying zones on a reel, mounting optical connectors at both ends of the reels, laying the optical cable by winding along the aerial line by mounting the reel on a winding machine on the aerial line already installed, disposing optical connectors on the supports at both ends of the laying zone, laying at the adjacent zones of the laying zone, and connecting the optical cables of the adjacent zones on the support. Thus, since the optical cables of the adjacent zones can be connected on the support, the connecting work at the laying site can be extremely simplified.

The above and other related objects and features of the invention will be apparent from a reading of the following description of the disclosure found in the accompanying drawings and the novelty thereof pointed out in the appended claims.

DESCRIPTION OF THE PREFERRED EMBODIMENTS

Figure 1:
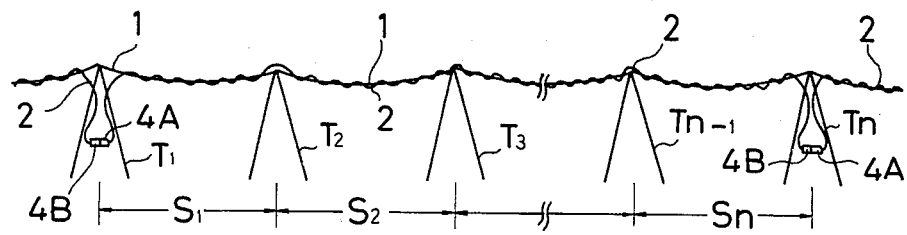
FIG. 1 is an explanatory view showing an embodiment of a method of laying an optical cable according to the present invention.
Figure 2:
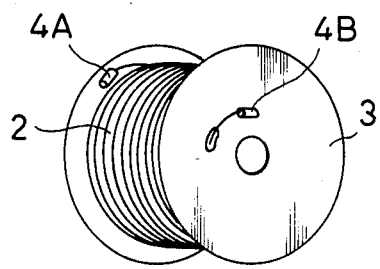
FIGS. 2 and 3 are perspective views showing that the optical cable is wound on a reel in one step of the laying method.

An embodiment of a method of laying an optical cable in an aerial line will now be described. The optical cable 2 is wound and laid along an aerial ground line 1 of zone from steel tower $T_1$ to $T_n$ of a power transmission aerial line as shown in FIG. 1.

The length of the optical cable is calculated from the total $S_1 + S_2 + \ldots + S_n$ of the steel tower intervals of the laying zone and the necessary marginal length. The optical cable 2 is measured in the required length and wound on a reel 3, and optical connectors 4A and 4B are mounted at both ends of the reel. This work is ordinarily performed in a factory. The reel 3 is mounted in a winding machine of self-traveling or towing type and the machine is moved from one end of the laying zone, i.e. from the steel tower $T_1$ side in this example along the aerial ground line. Thus, the optical cable 2 is wound and laid on the aerial line 1. Since the optical cable 2 is measured in advance in the necessary length for the zone to be laid, the optical connectors 4A and 4B are disposed between the steel towers $T_1$ and $T_n$ at both ends when the laying work is finished.

The above-mentioned laying work is also achieved in an adjacent zone. Thus, the optical cables 2, 2 of the adjacent zone can be connected merely by connecting the optical connectors 4A and 4B on the steel towers $T_1$ and $T_n$ in which the ends of the optical cable 2 are disposed.

Figure 3:
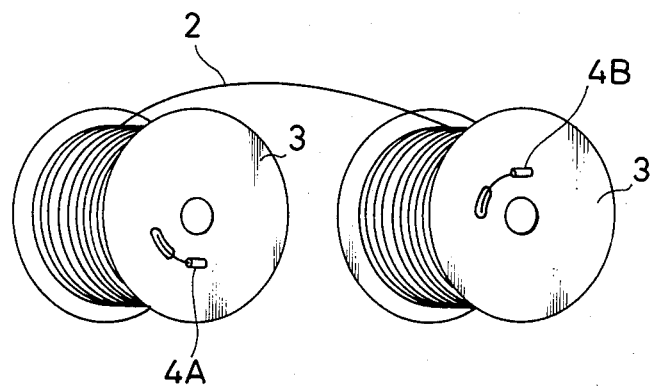

In the embodiment described above, the embodiment in which the optical cable is wound and laid from one to other sides of the laying zone has been described. However, when the optical cable is laid from the center to the both ends of the laying zone, the optical cable 2 is sorted and wound to two reels 3, 3 as shown in FIG. 3, and the optical connectors 4A and 4B may be mounted at both ends.

According to this invention as described above, the optical connectors are mounted at both ends of the optical cable measured in advance in the necessary length, and the optical cable is laid along the aerial line. Consequently, the optical cable between the adjacent laying zones can be connected by the connectors on the support, and the connecting work can be very simply performed on the support to shorten the working time.

What is claimed is:

1. A method of laying an optical cable on an aerial line between supports defining a laying zone comprising the steps of:
   (a) winding the optical cable measured in a necessary length for a laying zone on a reel,
   (b) mounting optical connectors at both ends of the reels,
   (c) laying the optical cable by winding at the aerial line by mounting the reel on a winding machine on the aerial line already installed,
   (d) disposing optical connectors on the supports at both ends of the laying zone,
   (e) laying optical cable at an adjacent laying zone by repeating steps a, b and c, and
   (f) connecting the optical cables of the adjacent zones on the support.

2. The method according to claim 1, wherein said optical cables of adjacent zones are connected merely by connecting the optical connectors on the supports on which the ends of the optical cables are disposed.

3. A method of laying an optical cable on an aerial line between supports defining a laying zone, comprising the steps of:
 (a) winding the optical cable measured in a necessary length for a laying zone on two reels;
 (b) mounting optical connectors at both ends of the optical cable wound on the reels;
 (c) laying the optical cable from the center of the laying zone to the ends of the laying zone by unwinding the cable on the two reels;
 (d) disposing optical connectors on the supports at the ends of the laying zone;
 (e) laying optical cable at an adjacent laying zone by repeating steps a, b, and c; and
 (f) connecting the optical cables of the adjacent zones on the support.

* * * * *